(12) United States Patent
Davis

(10) Patent No.: US 6,739,154 B2
(45) Date of Patent: May 25, 2004

(54) METHOD FOR MANUFACTURING OPTICAL GRATINGS

(75) Inventor: Monica K. Davis, Belmont, MA (US)

(73) Assignee: Corning Incorporated, Corning, NY (US)

( * ) Notice: Subject to any disclaimer, the term of this patent is extended or adjusted under 35 U.S.C. 154(b) by 450 days.

(21) Appl. No.: 09/840,856

(22) Filed: Apr. 24, 2001

(65) Prior Publication Data
US 2002/0178756 A1 Dec. 5, 2002

(51) Int. Cl.[7] .............................................. C37B 37/07
(52) U.S. Cl. ........................................... 65/378; 65/392
(58) Field of Search ........................... 65/378, 392, 485, 65/529; 385/10, 12, 13; 359/566, 568, 572; 356/73.1, 305, 328, 334, 902

(56) References Cited

U.S. PATENT DOCUMENTS

| | | | | |
|---|---|---|---|---|
| 4,807,950 A | * | 2/1989 | Glenn et al. ................. | 385/123 |
| 5,048,913 A | * | 9/1991 | Glenn et al. .................... | 385/37 |
| 5,331,391 A | | 7/1994 | Bukhshtab ................. | 356/73.1 |
| 5,388,173 A | * | 2/1995 | Glenn .......................... | 385/37 |
| 5,394,488 A | | 2/1995 | Fernald et al. ................ | 385/13 |
| 5,400,422 A | | 3/1995 | Askins et al. | |
| 5,493,113 A | * | 2/1996 | Dunphy et al. ........ | 250/227.19 |
| 5,939,136 A | * | 8/1999 | Cronk et al. ............. | 427/163.2 |
| 5,986,749 A | * | 11/1999 | Wu et al. ................... | 356/73.1 |
| 6,004,639 A | * | 12/1999 | Quigley et al. ............ | 428/36.3 |
| 6,067,391 A | * | 5/2000 | Land .......................... | 385/27 |
| 6,226,426 B1 | * | 5/2001 | Magne et al. ................. | 385/24 |
| 6,260,388 B1 | | 7/2001 | Borrelli et al. ............... | 65/393 |
| 6,289,699 B1 | * | 9/2001 | Kewitsch et al. ............ | 65/406 |
| 6,453,094 B1 | * | 9/2002 | Yue .............................. | 385/37 |
| 6,603,559 B2 | * | 8/2003 | Tsao et al. ................... | 356/479 |
| 2001/0020375 A1 | * | 9/2001 | Novack et al. ............... | 65/485 |
| 2002/0041722 A1 | * | 4/2002 | Johnson et al. .............. | 385/12 |
| 2002/0102057 A1 | * | 8/2002 | Yue .............................. | 385/43 |
| 2002/0175001 A1 | * | 11/2002 | Lepley et al. ................ | 174/139 |
| 2002/0176647 A1 | * | 11/2002 | Spirin et al. .................. | 385/12 |
| 2002/0178755 A1 | * | 12/2002 | MacDougall et al. ......... | 65/378 |
| 2002/0178756 A1 | * | 12/2002 | Davis .......................... | 65/378 |
| 2002/0181909 A1 | * | 12/2002 | Grunbeck et al. .......... | 385/123 |
| 2003/0118297 A1 | * | 6/2003 | Dunphy et al. ............. | 385/102 |
| 2003/0126930 A1 | * | 7/2003 | De La Puente et al. ...... | 73/800 |

FOREIGN PATENT DOCUMENTS

| | | | | |
|---|---|---|---|---|
| EP | 435201 A2 | * | 7/1991 | ............ G02B/6/12 |
| WO | WO 9739371 A1 | * | 10/1997 | ............ G02B/6/16 |

OTHER PUBLICATIONS

Chung et al., "A Fiber Brag Grating Sensor Demodulation Technique Using a Polarization Maintaining Fiber Loop Mirror," IEEE Phonotics Technology Letters, vol. 13, No. 12, Dec. 2001, PP 1343–1345.*

Salvatore et al., "Fiber–Bragg–stabilized lasers power amplifiers for DWDM", Laser Focus World, Nov. 1999, pp. 113–118.

AFC Technologies Inc., Excellence in Optical Amplifier Technology, "BBS Series High Power Broadband Sources" pp. 11–13.

(List continued on next page.)

Primary Examiner—José A. Fortuna
(74) Attorney, Agent, or Firm—Svetlana Z. Short; Thomas W. Cole

(57) ABSTRACT

A method for manufacturing an optical grating on a length of optical fiber having input and output ends. Guided light is conducted into the input end of the fiber and light reflected back from the output end is measured with an optical sensor. An optical grating is formed in the fiber between the input and output ends and guided light is conducted into the input end of the fiber and light reflected back from the grating is measured with an optical sensor. Measured light is compared to determine a percentage of guided light reflected back from the grating.

30 Claims, 4 Drawing Sheets

OTHER PUBLICATIONS

Ky et al., "Effects of drawing tension on the photosensitivity of Sn–Ge– and B–Ge codoped core fibers", Optics Letters, vol. 23, No. 17, Sep. 1, 1998, pp. 1402–1404.

Xie et al., "Experimental evidence of two types of photorefractive effects occurring during photoinscriptions of Bragg gratings within germanosilicate fibres", Optics Communications, vol. 104, No. 1,2,3, Dec. 15, 1993, pp. 185–195.

Fonjallaz et al., "Tension increase correlated to refractive–index change in fibers containing UV–written Bragg gratings", Optics Letters, vol. 20. No. 11, Jun. 1, 1995, pp. 1346–1348.

Aktins et al., "Control of Defects in Optical Fibers– A Study Using Cathodoluminescence Spectroscopy", Journal of Lightwave Technology, vol. 11, No. 11, Nov. 1993, pp. 1793–1801.

Williams et al., "Enhanced UV Photosensitivity in Boron Codoped Germanosilicate Fibres", Electronics Letters, Jan. 7, 1993, Vo. 29, No. 1, pp. 45–47.

Lemaire et al., "High Pressure $H_2$ Loading As A Technique for Achieving Ultrahigh UV Photosensitivity and Thermal Sensitivity in $GeO_2$ Doped Optical Fibres", Electronics Letters, Jun. 24, 1993, vol. 29, No. 13, pp. 1191–1192.

Dong et al., Enhanced Photosensitivity in Tin–Codoped Germanosilicate Optical Fibers, IEEE Photonics Technology Letters, vol. 7, No. 9, Sep. 1995, pp. 1048–1050.

* cited by examiner

METHOD FOR MANUFACTURING OPTICAL GRATINGS

FIELD OF THE INVENTION

The invention relates to forming optical gratings. More specifically, the invention relates to methods for forming optical gratings which are readily adaptable to use in connection with weak fiber Bragg gratings and to automated fabrication techniques.

BACKGROUND OF THE INVENTION

Fiber Bragg gratings are optical fibers that have been modified by modulating the longitudinal index of refraction of the fiber core, cladding or both to form a pattern. A fiber Bragg grating functions to modify the optical passband of the fiber (transmission characteristic) in such a way as to only transmit a selected and controlled wavelength band and to reflect other wavelengths.

Fiber Bragg gratings have been applied to optical communications systems for Wavelength Division Multiplexing (WDM) and in various other applications, such as reflectors and filters. One known application for fiber Bragg gratings is the tuning, i.e. stabilization, of lasers. For example, it is well known to place a weak fiber Bragg grating within the fiber of a 980 nm amplifier pump or a 1480 nm amplifier pump to stabilize the output wavelength.

Because of the plurality of variables which determine the transmissive and reflective characteristics of a fiber Bragg grating, such as the dimensions and refractive index of affected portions of the fiber, it is difficult to determine the characteristics of the grating prior to manufacturing the fiber Bragg grating. Therefore, the characteristics of fiber Bragg gratings ordinarily are determined by measuring the transmission characteristic of the fiber Bragg grating while forming, i.e., writing, the grating in the fiber and terminating the forming process when desired characteristics are obtained. Various processes for forming the gratings are well known. For example, the "holographic method" of forming a fiber Bragg grating comprises irradiating the fiber core from one side with a UV two beam interference pattern thus forming a permanent periodic refractive index modulation along the fiber axis by changing the refraction index of irradiated portions of the fiber.

However, laser stabilization techniques typically require reflection coefficients of the fiber Bragg grating on the order of 2%–4%, i.e. a "weak fiber Bragg grating". Such low, i.e. "weak" reflection coefficients result in transmission levels of only −0.08 dB to −0.18 dB. Spectral ripple on a typical commercially available 980 nm source of the type typically used to monitor fiber Bragg gratings is on the order of 0.2 dB or less per nm span. Accordingly, extracting a grating transmission signal from the source spectrum is difficult because it requires a very accurate reference spectrum. Modal interference further compounds this problem.

Nothwithstanding the above, the characteristics of fiber Bragg gratings can often be measured during grating fabrication using the above-noted transmissive method with a transmission reference taken immediately prior to formation of the grating. However, fiber Bragg gratings require an annealing cycle to complete formation. The annealing cycle and the usual subsequent need for a new optical connection to the grating ordinarily affect the absolute transmission reference for the grating. Therefore, the characterization of the grating after annealing often is not accurate.

SUMMARY OF THE INVENTION

A first aspect of the invention is a method for manufacturing an optical grating on a length of optical fiber having input and output ends, comprising the steps of conducting guided light into the input end of the fiber and measuring light reflected back from the output end with an optical sensor, forming an optical grating in the fiber between the input and output ends, conducting guided light into the input end of the fiber and measuring light reflected back from the grating with an optical sensor, and comparing measured light to determine a percentage of guided light reflected back from the grating.

A second aspect of the invention is a method of manufacturing grating on a length of optical fiber having input and output ends, comprising the steps of, conducting guided light into the input end of the fiber and measuring light reflected back from the output end, defining an optical terminator on the fiber, writing a grating in the fiber between the input end and the optical terminator, conducting guided light into the input end of the fiber and measuring light reflected back from the grating, and comparing the measured light to determine a characteristic of the grating.

BRIEF DESCRIPTION OF THE DRAWINGS

The invention is described through a preferred embodiment and the attached drawing in which.

DETAILED DESCRIPTION

Figure 1:
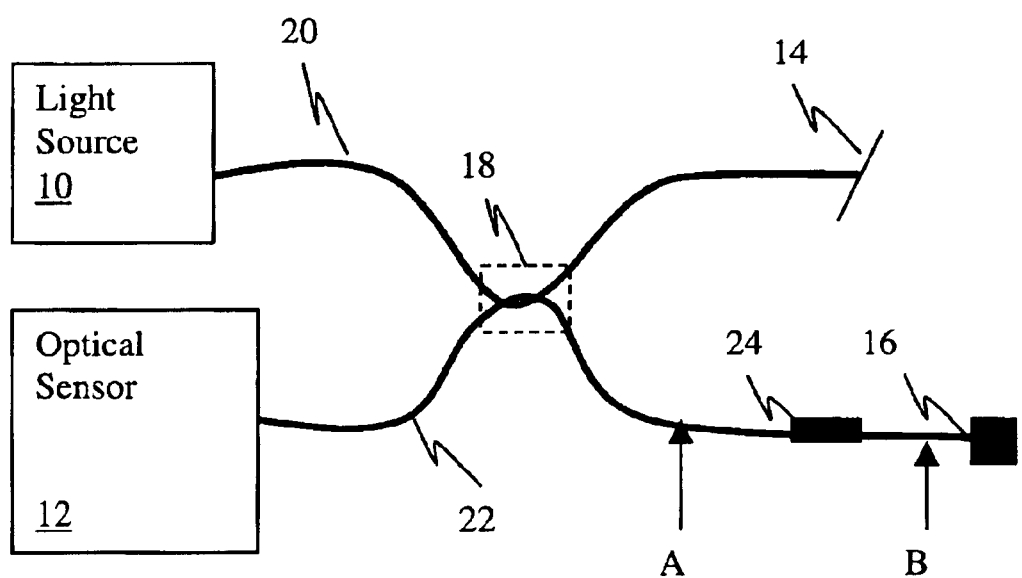
FIG. 1 is a schematic diagram of an apparatus for performing a method in accordance with a preferred embodiment.

FIG. 1 schematically illustrates a test apparatus for accomplishing the method of the preferred embodiment. Light source 10, such as a laser or other light source, has an output that is optically coupled to one end of optical fiber 20 to introduce light into optical fiber 20. The opposite end 14 of optical fiber 20 is terminated to avoid reflectance therefrom. Light guide device 18, such as an optical coupler or optical circulator, is coupled to optical fiber 20 and optical fiber 22 to define an input end of fiber 22 and to cause light from light source 10 guided by optical fiber 20 to enter optical fiber 22 and be guided to termination 16 defined on an output end of optical fiber 22. For example, light guide device 18 can have approximately a 3 dB coupling ratio at the target grating wavelength, 980 nm in the preferred embodiment. Termination 16 can be defined by a mechanical device which bends optical fiber 22, or by any other method for substantially eliminating back reflection through optical fiber 22. An end of optical fiber 22 is optically coupled to optical 12 sensor, such as an optical power meter, an optical spectrum analyzer, or any other device capable of measuring peak reflectivity of light. This configuration can be utilized for characterizing grating 24 formed on optical fiber 22.

With reference to FIG. 1, the reflected power $P_1$ of light measured at optical sensor 12 is represented by the following equation (in dBm):

$$P_1(\lambda) = P_{ASE}(\lambda) + L_{coupler, \times}(\lambda) + L_{splice}(\lambda) + R_{grating}(\lambda) + L_{splice}(\lambda) + L_{coupler, =}(\lambda)$$

Wherein:

$P_{ASE}(\lambda)$ represents the power spectral output of the light source 10;

$L_{coupler}$ refers to the power coupling ratio of light guide device 18 in the cross (x) and through (=) state;

alternatively, these terms can be replaced with the appropriate insertion loss terms for an optical circulator $L_{splice}$ indicates any splice loss, for example at a splice connection near point A.

$R_{grating}(\lambda)$ represents the spectral reflectivity of grating 24.

On the other hand power $P_2$ can be defined as the power of light measured by optical sensor 12 when a flat cleave is introduced at point A in FIG. 1 in front of grating 24, at point B before grating 24 is formed, or by using out-of-band wavelengths of light with respect to grating 24 and a flat cleave at point B. $P_2$ can be expressed by the following equation:

$$P_2(\lambda) = P_{ASE}(\lambda) + L_{coupler,\times}(\lambda) + L_{splice}(\lambda) + R_{flat} + L_{splice}(\lambda) + L_{coupler,-}(\lambda)$$

Wherein: $R_{flat}$ is the Fresnel reflection level expected off the flat cleave. A reflective end such as a coated fiber endface or a fiber with an endface mirror may also be used in place of a flat cleave, and the above equation modified accordingly.

The difference between $P_1$ (grating 24 present) and $P_2$ (no grating 24) yields the reflectivity of grating 24 referenced to the flat cleave reflectivity as expressed by the following equation.

$$R_{grating}(\lambda_c) = P_1(\lambda_c) - P_2(\lambda) + R_{flat}$$

Wherein $P_2(\lambda)$ is measured at $\lambda_c$ if no grating was present when $P_2$ was measured, and at $\lambda_{out-of-band}$ otherwise.

$R_{flat}$ may be calculated using the effective fiber index (easily obtained from the grating center wavelength and phase mask period) and the refractive index of air.

Figure 2:
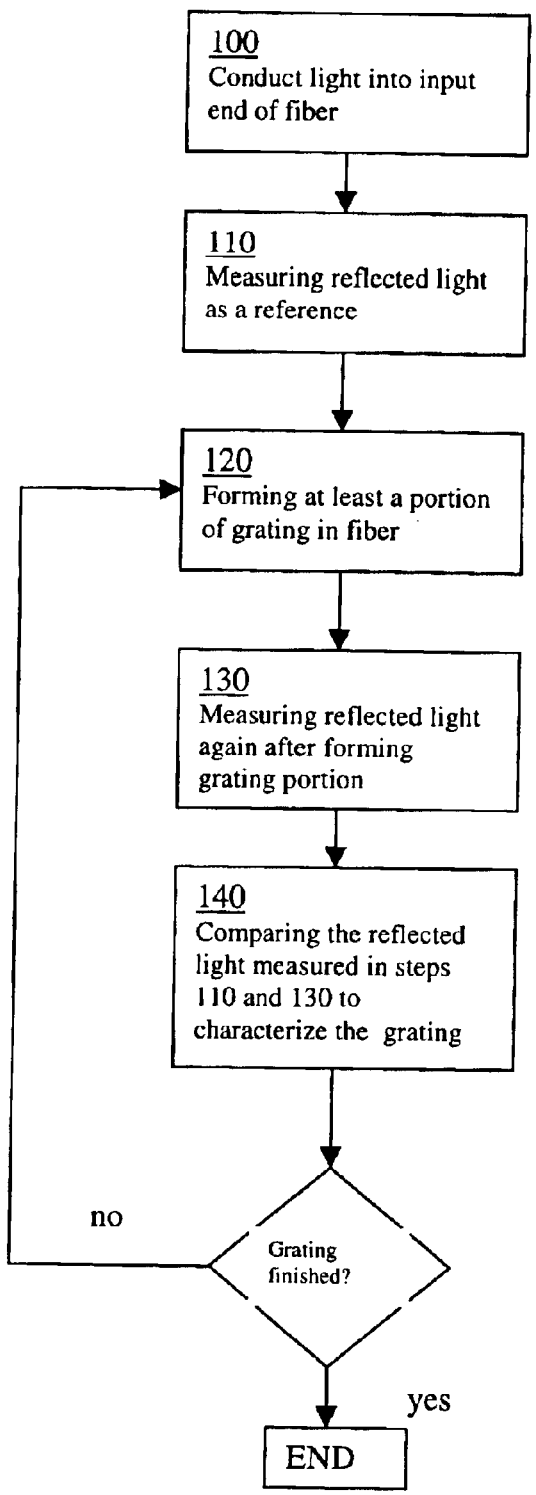
FIG. 2 is a flow chart of a method of the preferred embodiment.

FIG. 2 is a flow chart of the method of characterizing a grating during manufacture in accordance with a preferred embodiment of the invention. In step 100, light from light source 20 is guided into an input end of optical fiber 22 through optical fiber 20 and light guide device 18 prior to formation of grating 24 or in a manner that otherwise obviates the reflective characteristics of grating 24, such as by providing a flat cleave at point A in optical fiber 22 or using out of band wavelengths. Reflected light, due to the reflective characteristics of optical fiber 22, is then measured by optical sensor 12 in step 110. In step 120, grating 24, or at least a portion thereof, is formed in a conventional manner, such as by "writing" the grating using a near UV argon laser, a frequency doubled argon laser, or an excimer laser. During formation of grating 24, light from light source 10 reflected by grating 24 and the inherent reflectivity of optical fiber 22 are measured by optical sensor 12 in step 130.

Step 130 can be accomplished simultaneously while forming is accomplished in step 120 or step 130 can be accomplished periodically after a portion or all of grating 24 is formed in step 120. The reflected light in steps 130 and 110 are then compared in step 140 to determine the reflective characteristics of grating 24 using the equations discussed above. When the reflective characteristics of grating 24 correspond to desired predetermined characteristics, i.e. the grating is finished, the process ends. Otherwise, steps 120, 130, and 140 are repeated until the grating is finished.

Figure 3:
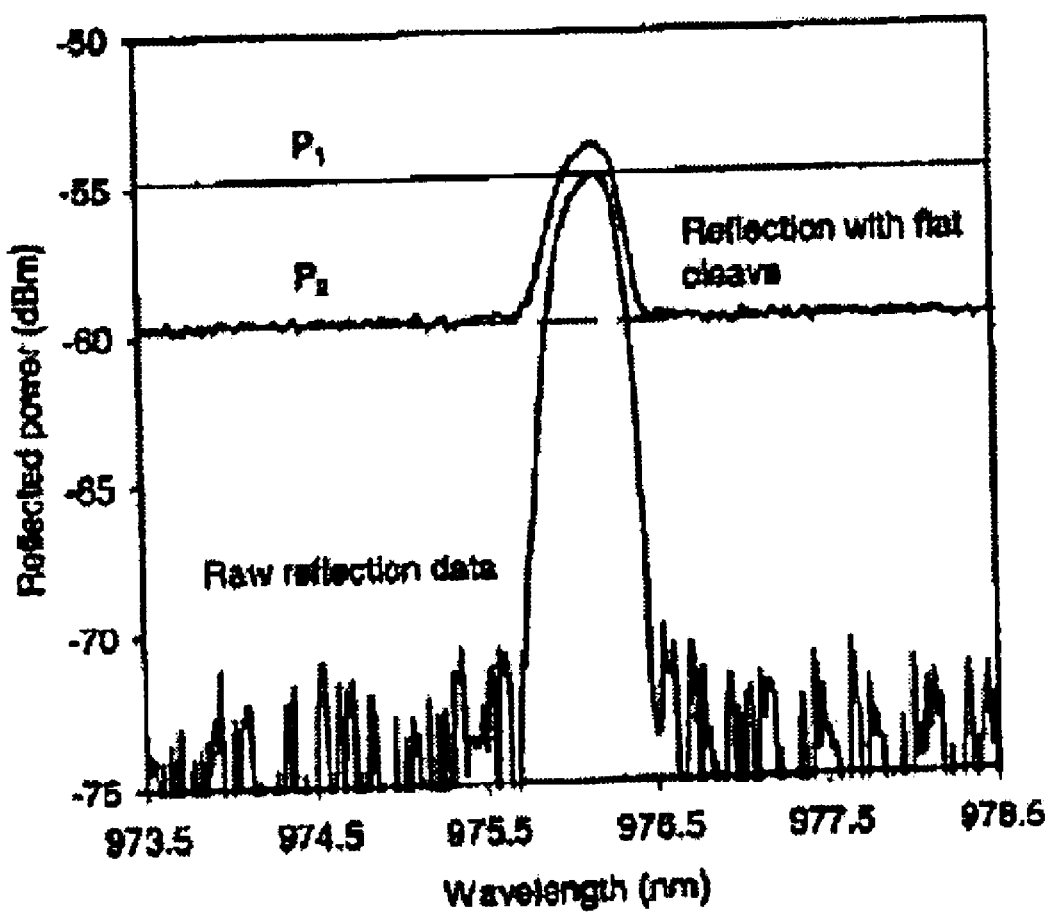
FIG. 3 is a graph of a reflection spectrum.

FIG. 3 illustrates a sample reflection spectrum from a grating formed in hydrogen loaded CS-980 fiber. The curve labeled "Raw reflection data" shows reflection with grating 24 as measured the output end of optical fiber 22 terminated in index gel inside a mechanical splice. The curve labeled "Reflection with flat cleave" shows the reflected spectrum with a flat cleave and grating 24 obviated (in this case using the out-of-band reflection level for comparison). The solid line shows the level of the peak from the raw data ($P_1(\lambda_c) = -54.8$ dBm) while the dashed line shows the reference level from the flat cleave spectrum ($P_2(\lambda_{out-of-band}) = -59.7$ dBm). Based on the center wavelength $\lambda_c = 976.14$ nm and the phase mask period $\Lambda_{mask} = 670$ nm, the effective index of the fiber $n_{eff} = 976.14/670 = 1.457$ so $R_{flat} = -14.6$ dB. From these data, the grating reflection coefficient $R_{grating}(\lambda_c) = 10.8\%$ based on the equations set forth above.

By referencing the reflectivity of grating 24 to a reflection which follows the same path through optical fiber 22, the preferred embodiment eliminates the need to ascertain variations in the output of light source 10, coupler ratio, and any losses due to splices. Further, the preferred embodiment eliminates errors induced by modal interference when a true transmission reference is not available. The preferred embodiment also permits differentiation between very weak reflection levels. For example 2% and 4% reflectors differ by about a tenth of dB (−0.09 to −0.18 dB) as measured in transmission but differ by 3 dB (−14 to −17 dB) when measured in reflection. The preferred embodiment can be used to form and characterize gratings having any reflectivity. However, the preferred embodiment is particularly well suited to forming weak gratings, i.e. gratings having reflectivity of less than 15%, preferably 1% to 10% and more preferably 2% to 4% because of the increased signal ratio afforded by the preferred embodiment.

Figure 4:
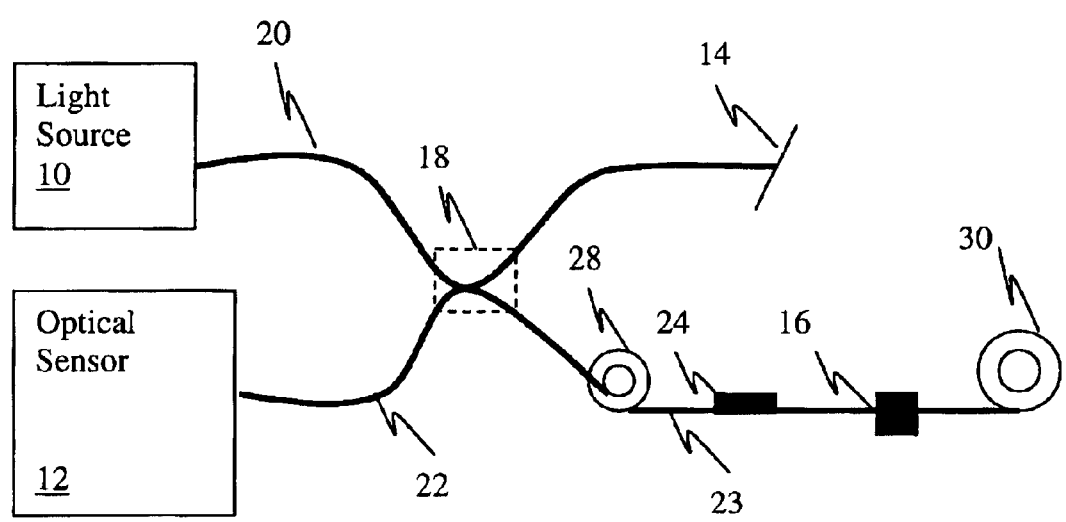
FIG. 4 is a schematic diagram of a modification of the apparatus of FIG. 1

FIG. 4 illustrates a modification of the apparatus illustrated in FIG. 1 suited for automated grating formation and characterization. The apparatus of FIG. 4 is similar in basic operation and construction to the apparatus of FIG. 1 and like reference numerals are used to label corresponding pans. In FIG. 4, grating 24 is formed on optical fiber 23 that extends between supply spool 28 and take up spool 30. Optical fiber 22 is optically coupled to optical fiber 23 through a rotating optical coupling associated with supply spool 28 to allow optical fiber 23 to be spooled off of supply spool 28 and spooled onto take up spool 30 without disrupting the coupling between optical fiber 22 and optical fiber 23. Terminator 16 is defined by a releasable element such as a clamp, by an object presenting a tortuous path to create bend-induced loss in optical fiber 23, or by any other means that permits intermittent movement of optical fiber 23 along the spooling direction. Termination may also be accomplished by cutting or breaking the optical fiber at location 16 to disrupt the optical path. In this case gratings may be written sequentially from fiber supply spool 28 without disrupting the coupling between optical fiber 22 and optical fiber 23. This creates a set of individuated gratings rather than a set of gratings on a take up spool 30.

In the automated method in accordance with the preferred embodiment, a reference reflection is measured, grating 24 is formed, reflection is measured, and grating 24 is characterized in the same manner as the preferred embodiment discussed with respect to FIGS. 1 and 2. However, after grating 24 is formed, optical fiber 23 can be spooled off of spool 28 and onto spool 30 with grating 24 now behind termination 16. At this point, the same reference reflection measurement can be used and another grating $24_1$ can be formed in a similar manner. This can be repeated for N gratings, N being any integer, as gratings $24_N$ are spooled onto spool 30. Termination 16 isolates the input end of optical fiber 23 from portions of optical fiber 23 that are wound onto spool 30. The changing length of optical fiber 23 on spool 28 can be accounted for by incorporating a well known attenuation factor per unit length of optical fiber 23 into the equations noted above.

Any type of light source can be used in connection with the invention. For example, laser light, or LED light can be used. The optical sensor can be of any type capable of detecting peak light values and can include any type of transducers and sensors. For example, the optical sensor can be an optical spectrum analyzer or a power meter. The grating can be of any type, such as a Bragg grating, can have any desired properties, and can be formed using any method. For example, the holographic method can be used. The grating can be formed using an excimer laser, a frequency doubled argon ion laser, a near UV ion laser, or any other appropriate energy form.

The invention has been described through a preferred embodiment. However, various modifications can be made without departing from the scope of the invention as defined by the appended claims and legal equivalents.

PARTS LIST

| | |
|---|---|
| 10 | Light Source |
| 12 | Optical Sensor |
| 14 | Termination |
| 16 | Termination Device |
| 18 | Light Guide Device |
| 20 | Optical Fiber |
| 22 | Optical Fiber |
| 23 | Optical Fiber |
| 24 | Grating |
| 28 | Supply Spool |
| 30 | Take-up Spool |

What is claimed is:

1. A method for manufacturing an optical grating on a length of optical fiber having input and output ends, comprising the steps of:
   (a) conducting guided light into said input end of said fiber and measuring light reflected back from said output end with an optical sensor;
   (b) forming an optical grating in said fiber between said input and output ends;
   (c) conducting guided light into said input end of said fiber and measuring light reflected back from said grating with an optical sensor;
   (d) comparing light measured in said steps (a) and (c) to determine a percentage of guided light reflected back from said grating; and
   (e) comparing said percentage to a predetermined percentage to determine whether the grating is finished.

2. The method of manufacturing an optical grating according to claim 1, wherein said step (b) comprises forming a fiber Bragg grating.

3. The method of manufacturing an optical grating according to claim 2, wherein said step (b) comprises writing said grating into said fiber with an excimer laser.

4. The method of manufacturing an optical grating according to claim 2, wherein said step (b) comprises writing said grating into said fiber with a frequency doubled argon ion laser.

5. The method of manufacturing an optical grating according to claim 2, wherein said step (b) comprises writing said grating into said fiber with a near UV argon ion laser.

6. The method of manufacturing an optical grating according to claim 2, wherein said step (b) comprises writing said grating into said fiber with a laser.

7. The method of manufacturing an optical grating according to claim 1, wherein said step (b) comprises forming a weak fiber Bragg grating.

8. The method of manufacturing an optical grating according to claim 7, wherein said steps (b), (c), and (d) are conducted simultaneously, and wherein said step (b) is terminated when said grating reflects a preselected percentage of said guided light.

9. The method of manufacturing an optical grating according to claim 1, further comprising the step of providing a flat cleave at said output end of said fiber prior to said step (a).

10. The method of manufacturing an optical grating according to claim 1, further comprising the steps of applying an optical terminator between said grating and said input end, and forming a second grating between said optical terminator and said input end, and repeating steps (c) and (d) for said second grating.

11. The method of manufacturing an optical grating according to claim 10, further comprising the steps of empirically determining a loss factor per unit length of said optical fiber, and correcting light measured in said step (a) with said loss factor to compensate for a change of the length of said fiber between said second grating and said input end.

12. The method of manufacturing an optical grating according to claim 1, wherein the measuring in said steps (a) and (c) comprises recording an output of an optical spectrum analyzer.

13. The method of manufacturing an optical grating according to claim 1, wherein the measuring in said steps (a) and (c) comprises recording an output of an optical power meter.

14. The method of manufacturing an optical grating according to claim 1, further comprising the step of connecting said input end to a source of guided light and an optical sensor prior to said step (a).

15. The method of manufacturing an optical grating according to claim 14, wherein said connecting step is implemented by an optical coupler.

16. The method of manufacturing an optical grating according to claim 14, wherein said connecting step is implemented by an optical circulator.

17. A method of manufacturing a grating on a length of optical fiber having input and output ends, comprising the steps of:
   (a) conducting guided light into said input end of said fiber and measuring light reflected back from said output end;
   (b) defining an optical terminator on said fiber;
   (c) writing a grating in said fiber between said input end and said optical terminator;
   (d) conducting guided light into said input end of said fiber and measuring light reflected back from said grating,
   (e) comparing the measured light from said step (a) with the measured light from said step (d) to determine a characteristic of said grating; and ;and
   (f) comparing said characteristic to the desired grating characteristic to determine whether the grating is finished.

18. The method of manufacturing an optical grating according to claim 17, wherein said step (e) comprises determining the percentage of guided light reflected back from said grating.

19. The method of manufacturing an optical grating according to claim 17, further comprising the step of providing a flat cleave at said output end of said fiber prior to measuring in said step (a).

20. The method of manufacturing an optical grating according to claim 17, further comprising:

(f) defining an optical terminator between said grating and said input end, and repeating steps (c), (d), and (e) for another grating.

21. The method according to claim 20, wherein the step of defining an optical terminator includes removing the grating from the length of optical fiber by breaking off a part of the fiber.

22. The method of manufacturing an optical grating according to claim 21, further comprising:

(g) winding a portion of the optical fiber onto a spool after each iteration of said step (f).

23. The method of manufacturing an optical grating according to claim 20, wherein said step (f) is repeated N times for N gratings, N being an integer.

24. The method of manufacturing an optical grating according to claim 17, further comprising the steps of empirically determining a loss factor per unit length of said optical fiber, and correcting the measurement in said steps (a) and (d) with said loss factor to compensate for a shortening of the length of said fiber between said another grating and said input end.

25. The method of manufacturing an optical grating according to claim 17, wherein said fiber is on a delivery spool, and wherein a portion of said fiber is wound onto a take-up spool before said step f.

26. The method of manufacturing an optical grating according to claim 17, wherein said steps (c), (d), and (e) are conducted simultaneously, and said step (c) is terminated when said grating reflects a preselected percentage of guided light.

27. The method according to claim 26, wherein said grating reflects less than 10% of said guided light through said input end.

28. The method of manufacturing an optical grating according to claim 17, wherein step (c) is terminated when said grating reflects between about 1% and 15% of the guided light conducted through said input end.

29. The method according to claim 28, wherein said grating reflects>5% of said light through said input end.

30. The method of manufacturing an optical grating according to claim 17, wherein step (c) is terminated when said grating reflects between about 2% and 4% of the guided light conducted through said input end.

* * * * *